US010795030B2

(12) United States Patent
Schipper et al.

(10) Patent No.: US 10,795,030 B2
(45) Date of Patent: Oct. 6, 2020

(54) POINTING SYSTEM ALIGNMENT USING GNSS ATTITUDE DETERMINATION WITH REMOVABLE GNSS ANTENNA

(71) Applicant: Honeywell International Inc., Morris Plains, NJ (US)

(72) Inventors: Brian Schipper, Brooklyn Park, MN (US); Ross Merritt, Ramsey, MN (US); Wayne A. Soehren, Wayzata, MN (US)

(73) Assignee: Honeywell International Inc., Charlotte, NC (US)

( * ) Notice: Subject to any disclaimer, the term of this patent is extended or adjusted under 35 U.S.C. 154(b) by 230 days.

(21) Appl. No.: 16/118,101

(22) Filed: Aug. 30, 2018

(65) Prior Publication Data
US 2020/0072985 A1    Mar. 5, 2020

(51) Int. Cl.
*G01S 19/53* (2010.01)
*G01C 25/00* (2006.01)
*G01C 21/12* (2006.01)
*G01S 19/36* (2010.01)

(52) U.S. Cl.
CPC ............. *G01S 19/53* (2013.01); *G01C 21/12* (2013.01); *G01C 25/005* (2013.01); *G01S 19/36* (2013.01)

(58) Field of Classification Search
CPC .... G01C 21/12; G01C 25/005; G01C 21/165; G01S 19/36; G01S 19/53
See application file for complete search history.

(56) References Cited

U.S. PATENT DOCUMENTS

| 5,617,317 A   | 4/1997 | Ignagni |
|---|---|---|
| 5,777,578 A   | 7/1998 | Chang et al. |
| 6,710,737 B1* | 3/2004 | Cronyn ................. G01S 7/4052 |
|               |        | 342/169 |
| 7,268,727 B2  | 9/2007 | Montgomery et al. |
| 8,471,762 B2  | 6/2013 | Zietz et al. |

(Continued)

OTHER PUBLICATIONS

Akrour et al., "Calibrating Antenna Phase Centers: A Tale of Two Methods", Innovation Antenna Calibration, GPS World, Published: Feb. 2005, pp. 49-53.

(Continued)

*Primary Examiner* — Timothy X Pham
(74) *Attorney, Agent, or Firm* — Fogg & Powers LLC

(57) ABSTRACT

An example pointing system includes a sensor that measures change in angular position, a first GNSS antenna, and a second GNSS antenna mounted to a rigid body that is removable from the pointing system after calibration of the sensor. The GNSS antennas have a fixed, known baseline. The pointing system includes at least one GNSS receiver with first and second RF inputs respectively coupled to the GNSS antennas. The at least one GNSS receiver includes respective paths to process GNSS signals received from the first and second RF inputs. The pointing system includes at least one processor, communicatively coupled to the sensor and receiver, configured to: determine initial attitude of the pointing system based on the processed GNSS signals; calibrate the sensor using the determined initial attitude; determine a pointing solution for the pointing system based on measurements from the calibrated sensor without GNSS signals from second GNSS antenna.

20 Claims, 4 Drawing Sheets

(56) References Cited

U.S. PATENT DOCUMENTS

| | | | |
|---|---|---|---|
| 8,686,900 B2 | 4/2014 | Whitehead et al. | |
| 2006/0238413 A1* | 10/2006 | Yehudaie | G01S 5/021 |
| | | | 342/174 |
| 2015/0219752 A1* | 8/2015 | Lewis | G01S 7/4052 |
| | | | 342/104 |

OTHER PUBLICATIONS

Navipedia, "Attitude Determination", URL: http://www.navipedia.net/index.php/Attitude_Determination, Downloaded: Jun. 13, 2018, pp. 1-2.

* cited by examiner

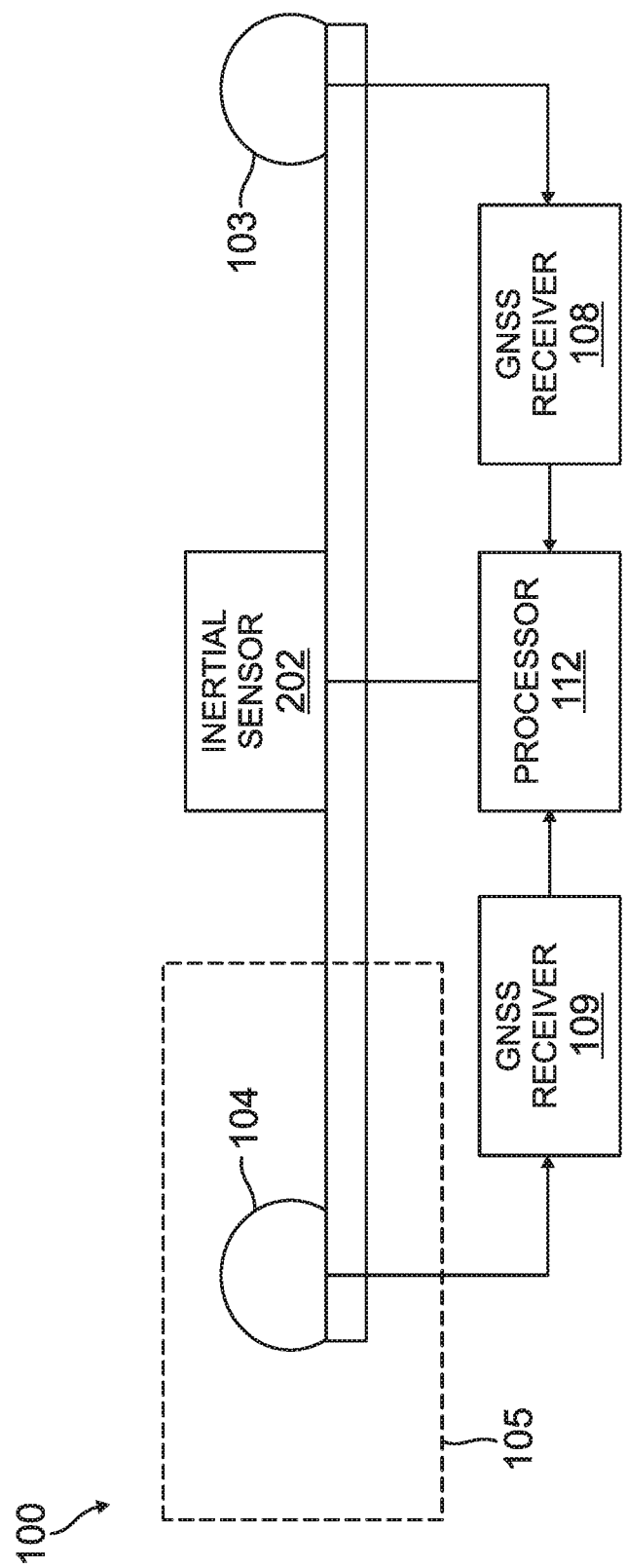

POINTING SYSTEM ALIGNMENT USING GNSS ATTITUDE DETERMINATION WITH REMOVABLE GNSS ANTENNA

BACKGROUND

For applications that require accurate pointing in the field, it can be challenging to calibrate the pointing system to absolute north and pitch. Such systems can use inertial sensors and/or angular position encoders to maintain an accurate pointing vector once aligned, but obtaining an accurate initial alignment for these pointing sensors has proven difficult.

SUMMARY

In one aspect, a pointing system includes a sensor configured to measure a change in angular position of the pointing system and a first GNSS antenna. The pointing system further includes a second GNSS antenna mounted to a rigid body, wherein the first GNSS antenna and the second GNSS antenna have a fixed, known baseline length. The second GNSS antenna mounted to the rigid body is configured to be removable from the pointing system after calibration of the sensor. The pointing system further includes at least one GNSS receiver comprising a first radio frequency input communicatively coupled to the first GNSS antenna and a second radio frequency input communicatively coupled to the second GNSS antenna. The at least one GNSS receiver further comprises a first processing path to process GNSS signals received at the first radio frequency input and a second processing path to process GNSS signals received via the second radio frequency input. The pointing system further includes at least one processor communicatively coupled to the sensor and the at least one GNSS receiver. The at least one processor is configured to determine an initial attitude of the pointing system based on the processed GNSS signals, calibrate the sensor using the determined initial attitude of the pointing system, and determine a pointing solution for the pointing system based on measurements from the calibrated sensor and without GNSS signals received at the second GNSS antenna.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 2A-2B are example pointing systems according to an aspect of the present disclosure.

Figure 1:
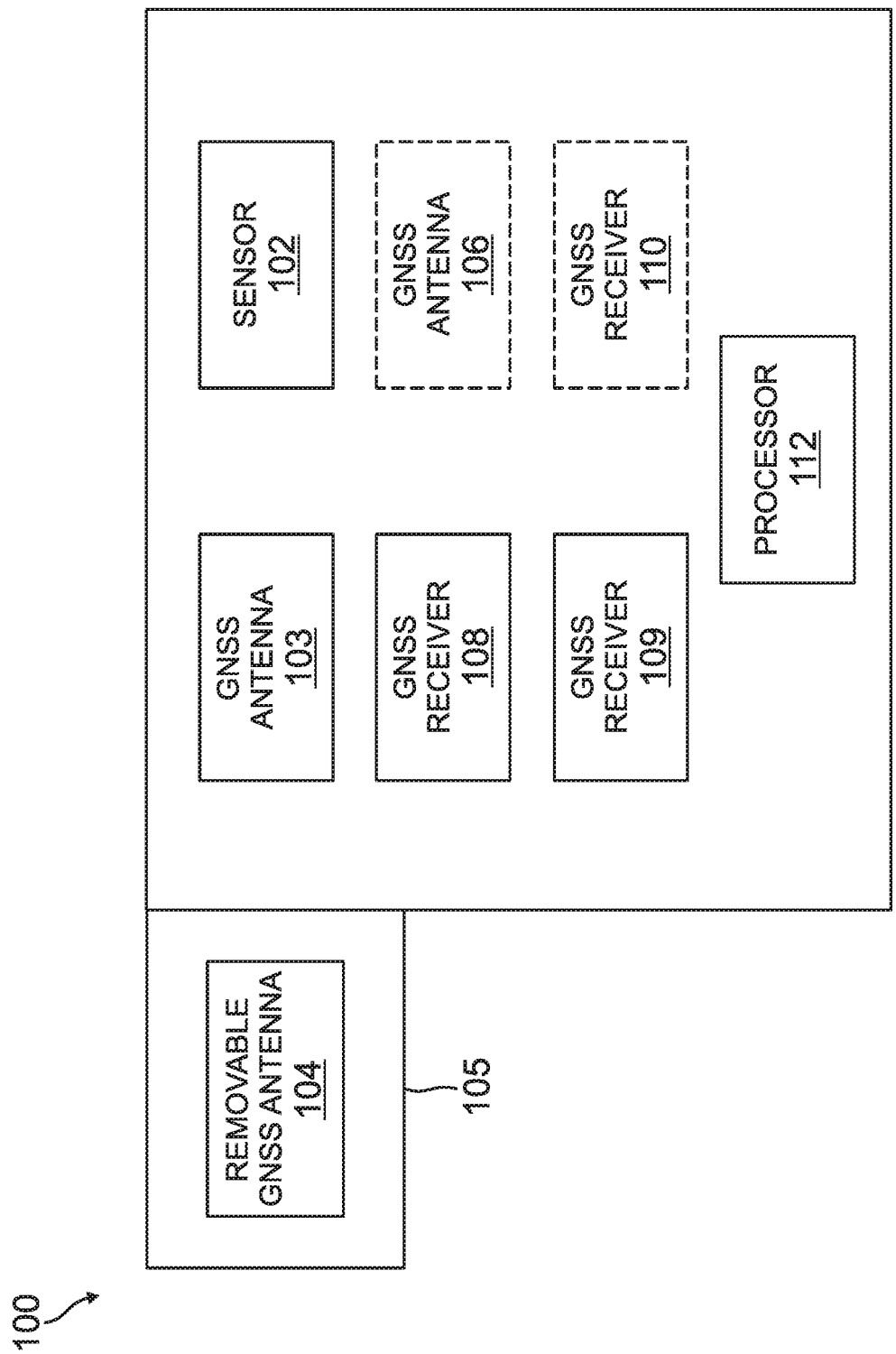
FIG. 1 is an example pointing system according to an aspect of the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

For field pointing or field navigation on the ground, an accurate indication of north or other calibration of a sensor is required for reliable performance. It is common for a navigation system or pointing system to utilize Global Navigation Satellite System (GNSS) attitude measurements to enhance accuracy. However, in environments where interference or jamming is a concern, GNSS signals are not readily available and can be blocked by enemies or blacked out for strategic reasons. Solutions that rely wholly or partially on GNSS signals for continuously providing pointing solutions may be rendered inoperable in such environments.

One alternative to using GNSS measurements for pointing is to use a north finder in combination with the pointing system. Generally, the inertial sensors required for north finders are larger and more expensive in order to provide the required accuracy, so this alternative can be prohibitive due to size and cost concerns.

Another alternative for calibrating the pointing system involves pointing at a distant object that has known relative position to the reference. However, this presents numerous problems because pointing at a distant object can be difficult if not impossible depending on the operating environment. This alternative requires line-of-site and adequate visual conditions, which may not be available due to weather or other factors. Further, this alternative requires optical alignment and introduces potential error sources. Lastly, this alternative requires knowledge of the particular location of the distant object, which may not be available or known with enough accuracy to enable calibration.

Another alternative involves using very accurate inertial sensors to perform gyro-compass alignment. Inertial sensors of the quality to perform gyro-compass alignment are expensive and can be cost prohibitive for many applications.

For the reasons described herein, and for other reasons that will be apparent to those skill in the art upon reading the present application, there is a need for a reduced size and more cost-effective pointing system that provides acceptable accuracy in the field.

The embodiments described herein include a pointing system that utilizes GNSS signals received by two or more GNNS antennas to determine a very accurate static alignment solution in order to calibrate a sensor configured to measure a change in angular position. The sensor may be, for example, a low-cost inertial sensor or an angular position encoder. After alignment and calibration of the sensor using the alignment solution, one of the GNSS antennas is removed from the pointing system. Thus, the second GNSS antenna can be viewed as a temporary appendage to the navigation system.

In an example of operation, the pointing system can be set down and a rigid element with the second GNSS antenna mounted to it can be attached to the pointing system. The pointing system is initialized and a pointing solution can be obtained in a short amount of time. The sensor is aligned and/or calibrated based on the solution. After calibration, the second GNSS antenna can be removed and the pointing system can operate with a single GNSS antenna or without any GNSS antenna and rely only on the sensor. GNSS signals can continue to be used as well when available, but the use of GNSS is not necessary for accurate pointing. The systems and methods described herein are particularly advantageous in combat environments where GNSS can be jammed or otherwise taken away for various reasons. The systems and methods are also effective in mitigating the effect of other radio frequency interference from personal GNSS jammers or other noise sources.

A particularly beneficial feature of the systems and methods described herein is that one or more of the GNSS antennas that receives GNSS signals used for producing the very accurate static alignment solution is designed to be removed from the system after calibration of the sensor. The removable GNSS antenna can be mounted to a rigid body, which is then attached to the pointing system. The removable GNSS antenna provides significant advantages for accuracy of the static alignment solution without requiring added size and reduced mobility for the pointing system when it is used in the field after calibration.

It is common for navigation systems and other systems that require position and/or orientation measurements to include at least one GNSS antenna, inertial system, and a GNSS receiver. Another benefit of using a removable GNSS antenna as described herein is that performance compared to current pointing systems with less accurate sensors can be significantly improved or upgraded by using a relatively inexpensive removable fixture or attachment with the second GNSS antenna and another GNSS receiver. This is also a much less expensive solution than incorporating high-precision inertial sensors into the pointing system.

FIG. 1 is a block diagram of an example pointing system 100 according to an aspect of the present disclosure. The example pointing system 100 in FIG. 1 includes a sensor 102, a first GNSS antenna 103, a second GNSS antenna 104 mounted to a rigid body 105, a first GNSS receiver 108, a second GNSS receiver 109, and at least one processor 112. The pointing system 100 optionally includes a third GNSS antenna 106 and third GNSS receiver 110.

The sensor 102 is communicatively coupled to the at least one processor 112. The sensor 102 is configured to measure a change in angular position of the pointing system 100 and provide the measurements to the at least one processor 112. The sensor 102 is preferably a low-cost sensor. As used herein, a low-cost sensor provides less accuracy than a high-precision sensor and is less expensive than a high-precision sensor. A high-precision sensor can be used if desired, but it is advantageous to use low-cost sensors to reduce the overall cost of the pointing system 100.

Figure 2B:
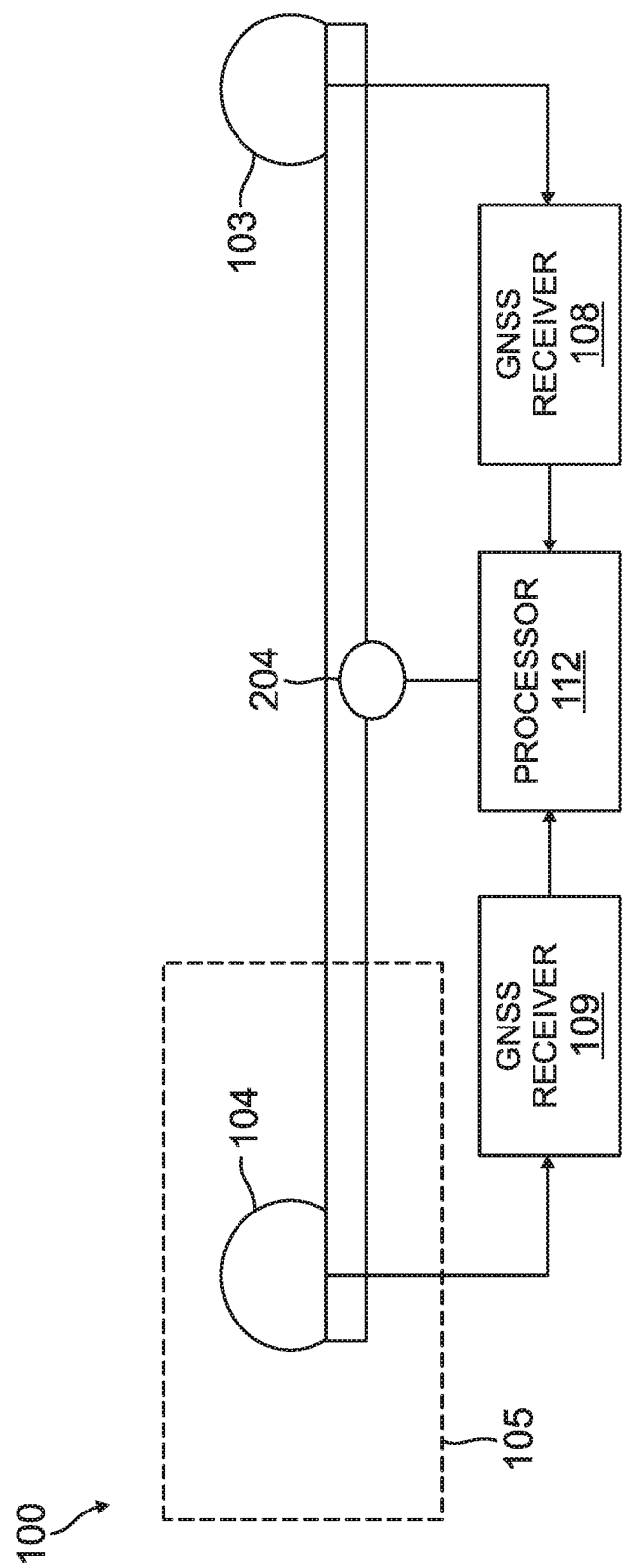

FIGS. 2A-2B show particular examples of pointing system 100, which each utilize a different type of sensor 102. In the example shown in FIG. 2A, the sensor 102 is an inertial sensor 202 that includes at least one gyroscope. In some examples, the inertial sensor 202 is a low-cost inertial measurement unit (IMU) and includes three accelerometers and three gyroscopes. The inertial sensor 202 can also include other motion-sensing devices such as magnetometers depending on the requirements of the pointing system 100.

In the example shown in FIG. 2B, the sensor 102 is an angular position encoder 204. An angular position encoder 204 measures the amount that the system has turned in angle as the system rotates. The angular position encoder 204 can include a pick-off and converts the angular position into an electrical signal. The angular position encoder 204 can be an absolute encoder or an incremental encoder.

The pointing system 100 includes a first GNSS antenna 103 that is communicatively coupled to the first GNSS receiver 108. In some examples, the first GNSS antenna 103 is incorporated into the pointing system 100 and has a fixed position within the pointing system 100. The first GNSS antenna 103 can be single-frequency or multi-frequency. Due to faster ambiguity resolution, a multi-frequency GNSS antenna is preferred for most applications. Multi-frequency for GNSS typically implies combinations of L1, L2, and L1 and L5 frequencies for GPS, and E1 and E5 frequencies for Galileo. In some examples, the first GNSS antenna 103 is configured to receive a combination of L1 and L2 and/or L5 frequencies for GPS. In some examples, the first GNSS antenna 103 is configured to receive a combination of E1 and E5 frequencies for Galileo. Other combinations of frequencies can be used for different constellations as well. In some examples, the first GNSS antenna 103 is configured to receive GNSS signals from satellites in multiple constellations (for example, GPS and GLONASS).

The pointing system 100 includes a second GNSS antenna 104 that is communicatively coupled to the second GNSS receiver 109. The second GNSS antenna 104 is configured to be removably attached to the pointing system 100. For example, the second GNSS antenna 104 is mounted to a rigid body 105 that is configured to be coupled to the pointing system 100 using fasteners or the like. In some examples, the rigid body is a thermally and environmentally stable metal or truss structure that does not change under temperature and humidity. The rigid body is utilized to maintain the position of the second GNSS antenna 104. The second GNSS antenna 104 can be single-frequency or multi-frequency and multi-frequency is preferred for faster ambiguity resolution. In some examples, the second GNSS antenna 104 is configured to receive a combination of L1 and L2 and/or L5 frequencies for GPS. In some examples, the second GNSS antenna 104 is configured to receive a combination of E1 and E5 frequencies for Galileo. Other combinations of frequencies can be used for different constellations as well. In some examples, the second GNSS antenna 104 is configured to receive GNSS signals from satellites in multiple constellations (for example, GPS and GLONASS). The second GNSS antenna 104 is configured to be removed from the pointing system 100 after calibration of the sensor.

The first GNSS antenna 103 and the second GNSS antenna 104 have a fixed, known separation distance (also referred to as a baseline length). In some examples, the baseline length between the first GNSS antenna 103 and the second GNSS antenna 104 can range from approximately thirty centimeters to approximately ten meters. When implementing GNSS attitude determinations, a longer baseline length generally provides a more accurate pointing solution. However, the further the antennas are apart, the more difficult or time consuming it is to obtain a solution, so a baseline length greater than about ten meters provides diminishing returns.

In the examples shown in FIGS. 1-2B, each respective GNSS antenna is communicatively coupled to a radio frequency input of a respective GNSS receiver. In some examples, the GNSS antennas are coupled to the radio frequency input of the GNSS receivers using coaxial cable. A first GNSS receiver 108 is configured to process GNSS signals from the first GNSS antenna 103 and the second GNSS receiver 109 is configured to process GNSS signals from the second GNSS antenna 104. In some examples, the first GNSS receiver 108 and the second GNSS receiver 109 can share the same chassis and one or more components (for example, a clock). In some examples, the first and second GNSS receivers 108, 109 are integrated into the pointing system 100.

While respective GNSS receivers are shown in FIGS. 1-2B, it should be understood that the pointing system 100 could also be implemented using a single GNSS receiver to process GNSS from the first and second GNSS antennas 103, 104. In such examples, the single GNSS receiver includes a first radio frequency input communicatively coupled to the first GNSS antenna 103 and a second radio frequency input communicatively coupled to the second GNSS antenna 104. The single GNSS receiver would include a first processing path to process GNSS signals received via the first radio frequency input and a second processing path to process GNSS signals received via the second radio frequency input. In other words, the single GNSS receiver is specially designed with multiple channels (for receiving signals from multiple antennas) and should include a common clock signal. Using a single receiver can increase the cost of the pointing system 100 due to the custom-design requirements and introduce problems associated with using longer cabling. The additional system cost and problems could make a single GNSS receiver system impractical or otherwise undesirable for certain applications.

The at least one processor 112 is communicatively coupled to the sensor and the GNSS receivers. The at least one processor 112 is configured to receive the measurements from the GNSS receivers and determine an initial attitude of the pointing system 100 based on the GNSS measurements from the GNSS receivers. The GNSS-based attitude determination can be performed using any methods known to those in the art.

In some examples, the pointing system 100 optionally includes a third GNSS antenna 106 and a third GNSS receiver 110 to enhance performance of the pointing system 100. In such examples, the first GNSS antenna 103 and the third GNSS antenna 106 have a fixed, known second baseline length. In some examples, the third GNSS antenna 106 is communicatively coupled to the third GNSS receiver 110 that includes a third radio frequency input and a third processing path to process GNSS signals received via the third radio frequency input. The optional third GNSS antenna 106 can also be removable from the pointing system 100.

In some examples, the baseline length between one pair of GNSS antennas is less than the baseline for the second pair of GNSS antennas. In some examples, the baseline length between the first pair of GNSS antennas (such as, for example, the first GNSS antenna 103 and the third GNSS antenna 106) is about thirty centimeters to one meter and the baseline length between the second pair of GNSS antennas (such as, for example, the first GNSS antenna 103 and the third GNSS antenna 106) is about five meters to ten meters. By using one relatively short baseline, a pointing solution for the first pair of GNSS antennas can be obtained quickly, and this pointing solution can be used to solve the ambiguity resolution for the longer baseline pair of GNSS antennas. Using three GNSS antennas in this manner provides a more accurate attitude solution without requiring the longer duration for resolving the ambiguity resolution that is normally associated with longer baselines. It should be understood that more than three GNSS antennas could be used as well in a similar manner.

Once the initial attitude of the pointing system 100 is determined using the GNSS measurements, the at least one processor 112 is further configured to calibrate the sensor using the determined initial attitude of the pointing system 100. In some examples, the at least one processor 112 calibrates the sensor by aligning the general pointing solution determined using the sensor with the initial pointing solution determined using the GNSS signals. This provides a highly accurate starting point for the sensor such that the pointing system 100 can operate without GNSS going forward.

Once the sensor is calibrated, the second GNSS antenna 104 is removed from the system. The second GNSS antenna 104 is decoupled from the second GNSS receiver 109 and is not used by the pointing system 100 for determining the pointing solution going forward. In some examples, the second GNSS antenna 104 and rigid body to which it is mounted are incorporated into a fixture/attachment that is detachable from the pointing system 100 by removing fasteners holding the fixture/attachment in place. In some examples, the fixture/attachment also includes the optional third GNSS antenna 106 mounted to the rigid body.

The at least one processor 112 is further configured to determine a pointing solution for the pointing system 100 based on measurements from the calibrated sensor 102. In some examples, the at least one processor 112 is configured to determine the pointing solution using only measurements from the calibrated sensor 102. In some examples, the at least one processor 112 is configured to continue to use signals from the first GNSS antenna 103 and first GNSS receiver 108 to determine the pointing solution for the pointing system 100 when these GNSS signals and measurements are available. However, this is not required. Once the sensor 102 is calibrated, the pointing system 100 is capable of determining an accurate pointing solution without GNSS signals.

As discussed above, the present pointing system has a reduced size compared to other GNSS based solutions with two integrated GNSS antennas, which increases the mobility of the pointing system 100 and reduces the burden on the person or entity operating the pointing system 100. The larger structure is only required for the initial alignment and then the pointing system 100 performs the azimuth measurement after alignment without the second GNSS antenna. Further, the pointing system 100 can operate in GNSS denied environments with acceptable accuracy for most applications.

In some examples, the first GNSS antenna 103 is also removable from the pointing system 100 and the pointing system 100 is configured to operate without any GNSS signals after the initial alignment. In such examples, it may be necessary to realign the sensor 102 after a particular period of time due to drift for the inertial sensor 202 or angular position encoder 204.

Figure 3:
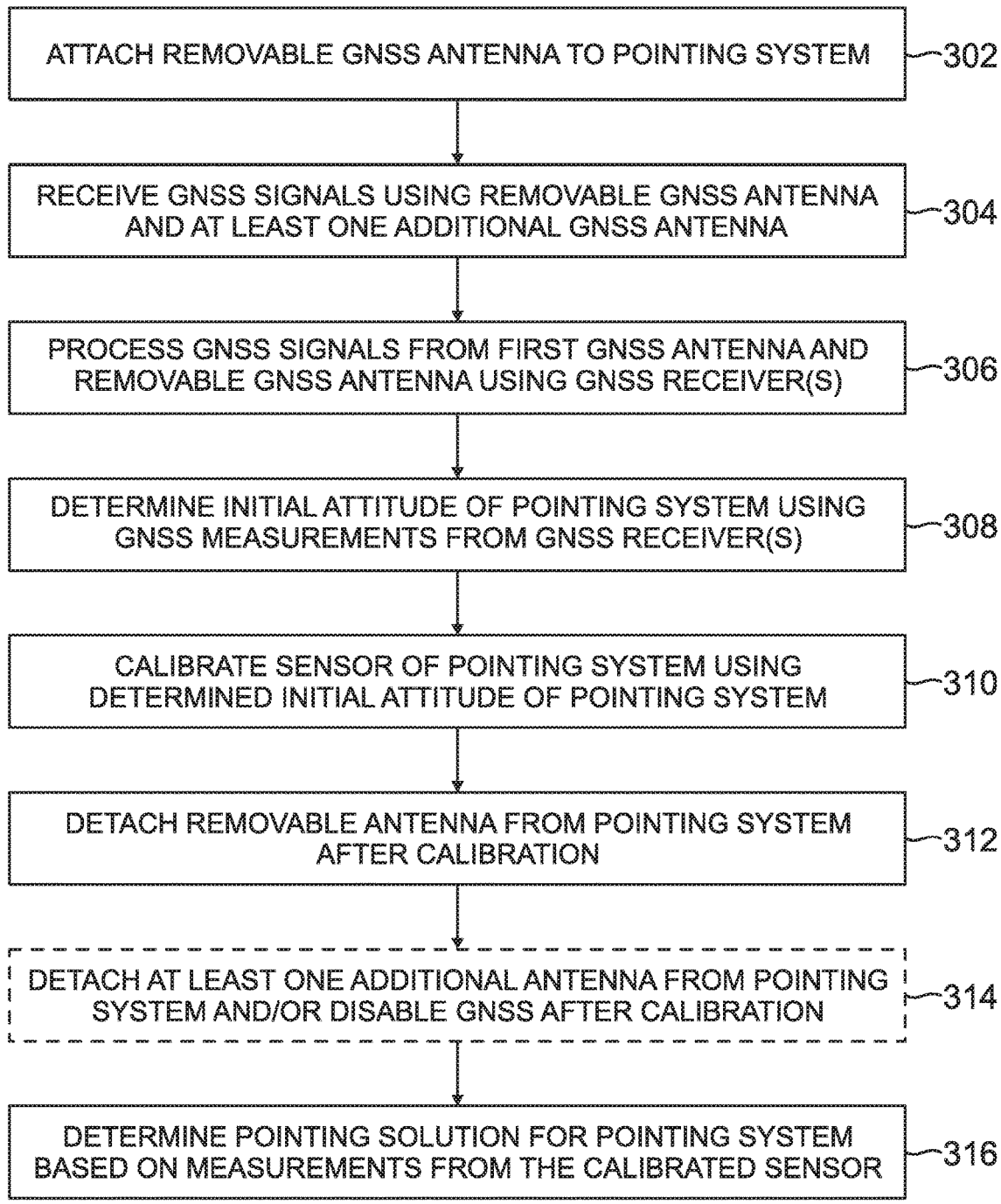
FIG. 3 is an example method for calibrating and operating a pointing system according to an aspect of the present disclosure.

FIG. 3 is an example method 300 for operating a pointing system according to an aspect of the present disclosure. The common features discussed above with respect to pointing system 100 in FIGS. 1-2B can include similar characteristics to those discussed with respect to method 300 and vice versa.

Method 300 begins with attaching a removable GNSS antenna to the pointing system (block 302). The removable GNSS antenna can be mounted to a rigid body, which is configured to be attached to the pointing system in a particular way. For example, the rigid body can include fasteners to couple to the device such that a distance between the removable GNSS antenna and at least one additional GNSS antenna is fixed and known. In some examples, the pointing system includes the at least one additional GNSS antenna and the at least one additional GNSS antenna is integrated into the pointing system. In other examples, the at least one additional GNSS antenna is also removable from the pointing system and mounted to a rigid body, which is configured to be attached to the pointing system as described above. In such examples, the rigid body can be the same for both GNSS antennas or different as long as the distance between the two GNSS antennas is fixed and known.

Method 300 proceeds with receiving GNSS signals at the removable GNSS antenna and the at least one additional GNSS antenna (block 304). The GNSS antennas are preferably multi-frequency antennas. In some examples, the GNSS antennas are configured to receive a combination of L1 and L2 and/or L5 frequencies for GPS. In some examples, the GNSS antennas is configured to receive a combination of E1 and E5 frequencies for Galileo. Other combinations of frequencies can be used for different constellations as well. In some examples, the GNSS antennas are configured to receive GNSS signals from multiple satellite constellations.

Method 300 proceeds with processing the GNSS signals from the first GNSS antenna and the second GNSS antenna using one or more GNSS receivers (block 306). The first and second GNSS antennas are communicatively coupled to one or more GNSS receivers using coaxial cabling, for example. The one or more GNSS receivers have separate processing paths for the GNSS signals from each respective GNSS antenna. As discussed above, the one or more GNSS receivers can be implemented with respective GNSS receivers for each respective antenna or with a single GNSS receiver with respective channels for the GNSS antennas. The one or more GNSS receivers are configured to determining GNSS ranging measurements using techniques known in the art.

Method 300 proceeds with determining an initial attitude of the pointing system based on the GNSS measurements from one or more GNSS receivers (block 308). The initial attitude of the pointing system is determined using techniques known to one having skill in the art.

Method 300 proceeds with calibrating a sensor using the determined initial attitude of the pointing system (310). The sensor is included in the pointing system and measures a change in angular position of the pointing system. In some examples, the sensor is an inertial sensor or an angular position encoder. In some examples, the sensor is calibrated by aligning an initial pointing solution determined using the sensor with the initial attitude of the pointing system determined using the GNSS measurements. Techniques for performing such alignment are known to those having skill in the art.

After calibration of the sensor is completed, method 300 proceeds with detaching or otherwise removing the removable GNSS antenna from the pointing system (block 312). The removable GNSS antenna is detached from the radio frequency input of the one or more GNSS receivers by uncoupling the coaxial cabling, for example. In some examples, the fasteners or other attachment mechanism used to attach the rigid body to which the removable GNSS antenna is mounted are decoupled from the pointing system.

Method 300 optionally proceeds with detaching the at least one additional GNSS antenna from the pointing system and/or disabling GNSS operation for the pointing system after calibration of the sensor is complete (block 314). In examples where the at least one additional GNSS antenna is also removable, this operation includes detaching the at least one additional GNSS antenna from the pointing system. In examples where the at least one additional GNSS antenna is integrated into the pointing system, the GNSS operation for the pointing system can be optionally disabled. This can include, for example, powering down the GNSS receiver or filtering the GNSS measurements so the measurements are not used for determining the pointing solution after calibration.

Method 300 proceeds with determining a pointing solution for the pointing system based on measurements from the calibrated sensor (block 316). In some examples, the determined pointing solution after calibration of the sensor is based solely on measurements from the calibrated sensor. For example, in a GNSS restricted environment caused by interference or intentional takedown or where GNSS operation of the pointing system is otherwise disabled, GNSS signals will not be available to the pointing system for use. In other examples, the determined pointing solution after calibration of the sensor is based in part on the measurements from the calibrated sensor and also the GNSS measurements from any remaining GNSS antenna/receiver combinations for the pointing system.

One application for the systems and methods described herein is an inexpensive handheld target locator that provides a pointing solution based on measurements from an inertial sensor or angular position encoder. The target locator can be realized by temporarily adding or otherwise attaching a fixture with a GNSS antenna for calibration purposes. The additional GNSS antenna fixture can be added for the purposes of aligning the inertial sensors or other device configured to provide measurements of a change in angular position. After calibration/alignment, the addition GNSS antenna is removed so the handheld target locator is more easily used in the field.

Another application of the above systems and methods is using the pointing system as a truth reference system to test another system. For example, if it is necessary to test the error characteristics of an IMU, then the pointing system can be used as a truth reference system for the IMU. Normally, a very accurate attitude reference is required where an IMU does not include an expensive gyroscope as part of the IMU.

The at least one processor 112 and other components of the pointing system include or function with software programs, firmware or other computer readable instructions for carrying out various methods, process tasks, calculations, and control functions, used in the operating the pointing system described above.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Example Embodiments

Example 1 includes a pointing system, comprising: a sensor configured to measure a change in angular position of the pointing system; a first Global Navigation Satellite System (GNSS) antenna; a second GNSS antenna mounted to a rigid body, wherein the first GNSS antenna and the second GNSS antenna have a fixed, known baseline length, wherein the second GNSS antenna mounted to the rigid body is configured to be removable from the pointing system after calibration of the sensor; at least one GNSS receiver comprising a first radio frequency input communicatively coupled to the first GNSS antenna and a second radio frequency input communicatively coupled to the second GNSS antenna, wherein the at least one GNSS receiver further comprises a first processing path to process GNSS signals received at the first radio frequency input and a second processing path to process GNSS signals received via the second radio frequency input; at least one processor communicatively coupled to the sensor and the at least one GNSS receiver, wherein the at least one processor is configured to: determine an initial attitude of the pointing system based on the processed GNSS signals; calibrate the sensor using the determined initial attitude of the pointing system; and determine a pointing solution for the pointing system based on measurements from the calibrated sensor and without GNSS signals received at the second GNSS antenna.

Example 2 includes the pointing system of Example 1, further comprising a third GNSS antenna, wherein the first GNSS antenna and the third GNSS antenna have a fixed, known second baseline length; wherein the at least one GNSS receiver further comprises a third radio frequency input communicatively coupled to the third GNSS antenna and a third processing path to process GNSS signals received via the third radio frequency input.

Example 3 includes the pointing system of Example 2, wherein the first baseline length is greater than the second baseline length.

Example 4 includes the pointing system of Example 3, wherein the first baseline length is approximately 5-10 meters.

Example 5 includes the pointing system of any of Examples 2-4, wherein the third GNSS antenna is also mounted to the rigid body.

Example 6 includes the pointing system of any of Examples 1-5, wherein the at least one GNSS receiver comprises: a first GNSS receiver including the first radio frequency input and the first processing path; and a second GNSS receiver including the second radio frequency input and the second processing path.

Example 7 includes the pointing system of any of Examples 1-6, wherein the sensor comprises a low-cost inertial sensor or angular position encoder.

Example 8 includes the pointing system of any of Examples 1-7, wherein the first GNSS antenna is mounted to the rigid body, wherein the first GNSS antenna is configured to be removable from the pointing system after calibration of the sensor.

Example 9 includes the pointing system of any of Examples 1-8, wherein the rigid body comprising a thermally, environmentally stable structure.

Example 10 includes the pointing system of any of Examples 1-9, wherein the first GNSS antenna and the second GNSS antenna are multi-frequency antennas.

Example 11 includes a method for operating a pointing system, the method comprising: attaching a removable Global Navigation Satellite System (GNSS) antenna mounted to a rigid body to the pointing system, wherein the pointing system includes a sensor configured to measure a change in angular position, a first GNSS antenna, and at least one GNSS receiver, wherein the removable GNSS antenna and the first GNSS antenna have a fixed, known baseline length; receiving GNSS signals with the first GNSS antenna and the removable GNSS antenna; processing the GNSS signals from the first GNSS antenna and the removable GNSS antenna using the at least one GNSS receiver; determining an initial attitude of the pointing system based on the processed GNSS signals from the GNSS receiver; calibrating the sensor using the determined initial attitude of the pointing system; removing the removable GNSS antenna from the pointing system after calibrating the sensor; and determining a pointing solution of the pointing system based on measurements from the calibrated sensor.

Example 12 includes the method of Example 11, further comprising removing the first GNSS antenna from the pointing system.

Example 13 includes the method of any of Examples 11-12, wherein determining a pointing solution of the pointing system based on measurements from the calibrated sensor comprises determining a pointing solution of the pointing system using only measurements from the calibrated sensor.

Example 14 includes the method of any of Examples 11-13, wherein determining the pointing solution of the pointing system is further based on processed GNSS signals from the first GNSS receiver.

Example 15 includes the method of any of Examples 11-14, further comprising attaching a third GNSS antenna to the pointing system, wherein determining an initial attitude of the pointing system is further based on processed GNSS signals from a third GNSS receiver.

Example 16 includes the method of Example 15, wherein the first GNSS antenna and the third GNSS antenna have a fixed, known second baseline length; wherein the first baseline length is greater than the second baseline length; the method further comprising determining a preliminary attitude determination using the second baseline length and using the preliminary attitude determination to resolve integer ambiguity for the second baseline length.

Example 17 includes the method of any of Examples 11-16, wherein calibrating the sensor using the initial attitude of the pointing system comprises aligning the pointing solution of the sensor with the initial attitude determined using the GNSS signals from the GNSS antennas.

Example 18 includes a system comprising: a sensor configured to measure a change in angular position of the pointing system; a first Global Navigation Satellite System (GNSS) antenna; a second GNSS antenna mounted to a rigid body, wherein the first GNSS antenna and the second GNSS antenna have a fixed, known separation distance, wherein the second GNSS antenna mounted to the rigid body is configured to be removably coupled to the pointing system using one or more fasteners; a first GNSS receiver comprising a first radio frequency input communicatively coupled to the first GNSS antenna, wherein the first GNSS receiver further comprises a first processing path to process GNSS signals received by the first GNSS antenna; a second GNSS receiver comprising a second radio frequency input communicatively coupled to the second GNSS antenna, wherein the second GNSS receiver further comprises a second processing path to process GNSS signals received by the second GNSS antenna; one or more processors communicatively coupled to the sensor, the first GNSS receiver, and the second GNSS receiver, wherein the at least one processor is configured to: determine an initial attitude of the pointing system based on the processed GNSS signals from the first GNSS receiver and the second GNSS receiver; calibrate the sensor using the determined initial attitude of the pointing system; and determine a pointing solution for the pointing system based on measurements from the calibrated sensor and without processed GNSS signals from the second GNSS receiver.

Example 19 includes the system of Example 18, wherein the sensor comprises a low-cost inertial sensor or angular position encoder.

Example 20 includes the system of any of Examples 18-19, wherein the system further comprises: a third GNSS antenna, wherein the first GNSS antenna and the third GNSS antenna have a fixed, known second baseline length; a third GNSS receiver that includes a third radio frequency input communicatively coupled to the third GNSS antenna and a third processing path to process GNSS signals received by the third GNSS antenna; wherein the one or more processors are communicatively coupled to the third GNSS receiver and configured to use the processed GNSS signals from the third GNSS receiver to determine the initial attitude of the system.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A pointing system, comprising:
    a sensor configured to measure a change in angular position of the pointing system;
    a first Global Navigation Satellite System (GNSS) antenna;
    a second GNSS antenna mounted to a rigid body, wherein the first GNSS antenna and the second GNSS antenna have a fixed, known baseline length, wherein the second GNSS antenna mounted to the rigid body is configured to be removable from the pointing system after calibration of the sensor;
    at least one GNSS receiver comprising a first radio frequency input communicatively coupled to the first GNSS antenna and a second radio frequency input communicatively coupled to the second GNSS antenna, wherein the at least one GNSS receiver further comprises a first processing path to process GNSS signals received at the first radio frequency input and a second processing path to process GNSS signals received via the second radio frequency input;
    at least one processor communicatively coupled to the sensor and the at least one GNSS receiver, wherein the at least one processor is configured to:
    determine an initial attitude of the pointing system based on the processed GNSS signals;
    calibrate the sensor using the determined initial attitude of the pointing system; and
    determine a pointing solution for the pointing system based on measurements from the calibrated sensor and without GNSS signals received at the second GNSS antenna.

2. The pointing system of claim 1, further comprising a third GNSS antenna, wherein the first GNSS antenna and the third GNSS antenna have a fixed, known second baseline length;
    wherein the at least one GNSS receiver further comprises a third radio frequency input communicatively coupled to the third GNSS antenna and a third processing path to process GNSS signals received via the third radio frequency input.

3. The pointing system of claim 2, wherein the first baseline length is greater than the second baseline length.

4. The pointing system of claim 3, wherein the first baseline length is approximately 5-10 meters.

5. The pointing system of claim 2, wherein the third GNSS antenna is also mounted to the rigid body.

6. The pointing system of claim 1, wherein the at least one GNSS receiver comprises:
    a first GNSS receiver including the first radio frequency input and the first processing path; and
    a second GNSS receiver including the second radio frequency input and the second processing path.

7. The pointing system of claim 1, wherein the sensor comprises a low-cost inertial sensor or angular position encoder.

8. The pointing system of claim 1, wherein the first GNSS antenna is mounted to the rigid body, wherein the first GNSS antenna is configured to be removable from the pointing system after calibration of the sensor.

9. The pointing system of claim 1, wherein the rigid body comprising a thermally, environmentally stable structure.

10. The pointing system of claim 1, wherein the first GNSS antenna and the second GNSS antenna are multi-frequency antennas.

11. A method for operating a pointing system, the method comprising:
    attaching a removable Global Navigation Satellite System (GNSS) antenna mounted to a rigid body to the pointing system, wherein the pointing system includes a sensor configured to measure a change in angular position, a first GNSS antenna, and at least one GNSS receiver, wherein the removable GNSS antenna and the first GNSS antenna have a fixed, known baseline length;
    receiving GNSS signals with the first GNSS antenna and the removable GNSS antenna;
    processing the GNSS signals from the first GNSS antenna and the removable GNSS antenna using the at least one GNSS receiver;
    determining an initial attitude of the pointing system based on the processed GNSS signals from the GNSS receiver;
    calibrating the sensor using the determined initial attitude of the pointing system;
    removing the removable GNSS antenna from the pointing system after calibrating the sensor; and
    determining a pointing solution of the pointing system based on measurements from the calibrated sensor.

12. The method of claim 11, further comprising removing the first GNSS antenna from the pointing system.

13. The method of claim 11, wherein determining a pointing solution of the pointing system based on measurements from the calibrated sensor comprises determining a pointing solution of the pointing system using only measurements from the calibrated sensor.

14. The method of claim 11, wherein determining the pointing solution of the pointing system is further based on processed GNSS signals from the first GNSS receiver.

15. The method of claim 11, further comprising attaching a third GNSS antenna to the pointing system, wherein determining an initial attitude of the pointing system is further based on processed GNSS signals from a third GNSS receiver.

16. The method of claim 15, wherein the first GNSS antenna and the third GNSS antenna have a fixed, known second baseline length;

wherein the first baseline length is greater than the second baseline length;

the method further comprising determining a preliminary attitude determination using the second baseline length and using the preliminary attitude determination to resolve integer ambiguity for the second baseline length.

17. The method of claim 11, wherein calibrating the sensor using the initial attitude of the pointing system comprises aligning the pointing solution of the sensor with the initial attitude determined using the GNSS signals from the GNSS antennas.

18. A system comprising:
a sensor configured to measure a change in angular position of the pointing system;
a first Global Navigation Satellite System (GNSS) antenna;
a second GNSS antenna mounted to a rigid body, wherein the first GNSS antenna and the second GNSS antenna have a fixed, known separation distance, wherein the second GNSS antenna mounted to the rigid body is configured to be removably coupled to the pointing system using one or more fasteners;
a first GNSS receiver comprising a first radio frequency input communicatively coupled to the first GNSS antenna, wherein the first GNSS receiver further comprises a first processing path to process GNSS signals received by the first GNSS antenna;
a second GNSS receiver comprising a second radio frequency input communicatively coupled to the second GNSS antenna, wherein the second GNSS receiver further comprises a second processing path to process GNSS signals received by the second GNSS antenna;
one or more processors communicatively coupled to the sensor, the first GNSS receiver, and the second GNSS receiver, wherein the at least one processor is configured to:
determine an initial attitude of the pointing system based on the processed GNSS signals from the first GNSS receiver and the second GNSS receiver;
calibrate the sensor using the determined initial attitude of the pointing system; and
determine a pointing solution for the pointing system based on measurements from the calibrated sensor and without processed GNSS signals from the second GNSS receiver.

19. The system of claim 18, wherein the sensor comprises a low-cost inertial sensor or angular position encoder.

20. The system of claim 18, wherein the system further comprises:
a third GNSS antenna, wherein the first GNSS antenna and the third GNSS antenna have a fixed, known second baseline length;
a third GNSS receiver that includes a third radio frequency input communicatively coupled to the third GNSS antenna and a third processing path to process GNSS signals received by the third GNSS antenna;
wherein the one or more processors are communicatively coupled to the third GNSS receiver and configured to use the processed GNSS signals from the third GNSS receiver to determine the initial attitude of the system.

* * * * *